United States Patent
Mima et al.

(10) Patent No.: US 11,459,248 B2
(45) Date of Patent: Oct. 4, 2022

(54) METHOD OF REMOVING SOLUBLE MANGANESE

(71) Applicant: METAWATER Co., Ltd., Tokyo (JP)

(72) Inventors: Satoru Mima, Tokyo (JP); Sadamitsu Shiode, Tokyo (JP); Hiroyuki Oyachi, Tokyo (JP); Kiyotaka Sugiura, Tokyo (JP); Hideki Takeuchi, Tokyo (JP)

(73) Assignee: METAWATER Co., Ltd., Tokyo (JP)

( * ) Notice: Subject to any disclaimer, the term of this patent is extended or adjusted under 35 U.S.C. 154(b) by 187 days.

(21) Appl. No.: 16/605,296

(22) PCT Filed: Apr. 5, 2018

(86) PCT No.: PCT/JP2018/014606
§ 371 (c)(1),
(2) Date: Oct. 15, 2019

(87) PCT Pub. No.: WO2018/198714
PCT Pub. Date: Nov. 1, 2018

(65) Prior Publication Data
US 2020/0299151 A1     Sep. 24, 2020

(30) Foreign Application Priority Data
Apr. 24, 2017   (JP) .................. JP2017-085428

(51) Int. Cl.
*C02F 1/28*     (2006.01)
*C02F 1/44*     (2006.01)
*C02F 1/76*     (2006.01)
*C02F 101/20*   (2006.01)

(52) U.S. Cl.
CPC .............. *C02F 1/283* (2013.01); *C02F 1/44* (2013.01); *C02F 1/76* (2013.01); *C02F 2101/206* (2013.01)

(58) Field of Classification Search
None
See application file for complete search history.

(56) References Cited

U.S. PATENT DOCUMENTS

| | | | |
|---|---|---|---|
| 5,271,830 A | 12/1993 | Faivre et al. | |
| 2006/0016758 A1* | 1/2006 | Mima | B01D 71/02 210/694 |

FOREIGN PATENT DOCUMENTS

| | | | |
|---|---|---|---|
| JP | S5127931 B1 * | 8/1976 | ............ B01D 15/00 |
| JP | S5127931 B1 | 8/1976 | |
| JP | H0739872 A | 2/1995 | |
| JP | H07185273 A | 7/1995 | |
| JP | 2002086193 A | 3/2002 | |
| JP | 3356928 B2 | 12/2002 | |

(Continued)

OTHER PUBLICATIONS

Jun. 26, 2018, International Search Report issued in the International Patent Application No. PCT/JP2018/014606.

(Continued)

*Primary Examiner* — Chester T Barry
(74) *Attorney, Agent, or Firm* — Kenja IP Law PC

(57) ABSTRACT

A method of removing soluble manganese includes: a mixing step of mixing water for treatment, activated carbon micropowder having an average particle size of not less than 0.1 µm and not more than 10 µm, and an oxidizing agent to obtain a water/activated carbon mixture; and a membrane filtration step of membrane filtering the water/activated carbon mixture to obtain treated water.

2 Claims, 1 Drawing Sheet

(56) References Cited

FOREIGN PATENT DOCUMENTS

| JP | 2003230895 | A |   | 8/2003  |         |
|----|------------|---|---|---------|---------|
| JP | 2003305485 | A |   | 10/2003 |         |
| JP | 2006255488 | A |   | 9/2006  |         |
| JP | 2009226285 | A |   | 10/2009 |         |
| JP | 2012196628 | A |   | 10/2012 |         |
| JP | 2014087787 | A | * | 5/2014  | C02F 9/00 |
| JP | 2014087787 | A |   | 5/2014  |         |
| JP | 2016175006 | A |   | 10/2016 |         |
| KR | 1020110114995 | A |   | 10/2011 |         |
| WO | WO-2018198714 | A1 | * | 11/2018 | C02F 1/283 |

OTHER PUBLICATIONS

Oct. 29, 2019, International Preliminary Report on Patentability issued in the International Patent Application No. PCT/JP2018/014606.

Jul. 8, 2021, Office Action issued by the China National Intellectual Property Administration in the corresponding Chinese Patent Application No. 201880025229.7.

Jan. 28, 2021, Office Action issued by the Canadian Intellectual Property Office in the corresponding Canadian Patent Application No. 3,060,163.

Sep. 29, 2020, Notification issued by the Japan Patent Office in the corresponding Japanese Patent Application No. 2019-515202.

Sep. 30, 2020, Office Action issued by the Intellectual Property Office of Singapore in the corresponding Singaporean Patent Application No. 11201909694Y.

Dec. 3, 2020, the Extended European Search Report issued by the European Patent Office in the corresponding European Patent Application No. 18789890.3.

Saitama Prefectural Enterprise Bureau, 2011 Water Purification Method Optimization Experiment Survey Report (Summary Version) (with a partial English translation), Mar. 2012.

Naoki Murata et al., A combination of finely powdered activated carbon and chemically strengthened backwash With off-flavor substances in membrane filtration treatment Improved removal performance of trihalomethane precursors (with a partial English translation), Journal of Japan Society of Civil Engineers, Ser. G (Environmental Research), 2014, pp. III_81 to III_94, vol. 70, No. 7.

Omuta-Arao Joint Water Purification Plant Facility Overview, Published on Mar. 19, 2010, from URL: https://www.city.omuta.lg-jp/common/uploadfiledsp.aspx?c_id-5&id-679&sub_id=1&flid=16&dan_id=1.

Mark Samblebe, Manganese Removal Using Chlorine Oxidation and Powdered Activated Carbon, 66th Annual Water Industry Engineers and Operators' Conference Eastbank Centre—Shepparton, Sep. 3 and 4, 2003, pp. 86 to 94.

Junki Yamaguchi et al., (4-3) Study on application of pulverized coal to coagulation sedimentation sand filtration, 2013 National Conference (Water Research Presentation), Oct. 2013, pp. 126 to 127.

Apr. 6, 2021, Notification of Reasons for Refusal issued by the Japan Patent Office in the corresponding Japanese Patent Application No. 2019-515202.

Aug. 30, 2021, Office Action issued by the Canadian Intellectual Property Office in the corresponding Canadian Patent Application No. 3,060,163.

Jan. 26, 2022, Office Action issued by the China National Intellectual Property Administration in the corresponding Chinese Patent Application No. 201880025229.7.

Apr. 21, 2022, Office Action issued by the Canadian Intellectual Property Office in the corresponding Canadian Patent Application No. 3,060,163.

May 18, 2022, Office Action issued by the China National Intellectual Property Administration in the corresponding Chinese Patent Application No. 201880025229.7.

Dean Gregory et al., Effect of soluble Mn concentration on oxidation kinetics, Journal AWWA, Jan. 2003, pp. 98 to 108, vol. 95, Issue 1.

Health Canada, Guidelines for Canadian Drinking Water Quality Summary Table, Sep. 2020, Government of Canada.

Yan Xushi Editor-in-chief, Waterworks Management Knowledge, Apr. 1993, pp. 7-8.

* cited by examiner

METHOD OF REMOVING SOLUBLE MANGANESE

TECHNICAL FIELD

The present disclosure relates to a method of removing soluble manganese, and, in particular, relates to a method of removing soluble manganese that includes treating raw water containing soluble manganese using activated carbon.

BACKGROUND

Rapid filtration treatment using a particulate filter medium such as filter sand is generally adopted as a filtration method for filtering raw water to obtain filtered water in a water purification plant or the like. In a situation in which chlorine is added to raw water containing soluble manganese in such rapid filtration treatment, the particulate filter medium such as filter sand becomes a manganese catalyst due to the chlorine addition, and this enables removal of soluble manganese in the raw water.

In recent years, attention has been focused on the introduction of a step of membrane treatment in water purification plants and the like (for example, refer to Patent Literature (PTL) 1 and 2). Since soluble manganese in raw water cannot be directly removed by filtration in a membrane treatment step, it is necessary to take action with respect to soluble manganese in raw water. PTL 1 describes a treatment method in which chlorine is mixed with raw water to obtain water that is a target for treatment, and then this water is brought into contact with the surface of solid manganese dioxide and is membrane filtered. PTL 2 describes a treatment method in which at least some soluble manganese in raw water is converted to manganese dioxide through oxidation with chlorine, charcoal powder is subsequently added, organic substances are removed to inhibit formation of disinfection by-products, and then water for treatment is subjected to membrane treatment and biological treatment.

CITATION LIST

Patent Literature

PTL 1: JP 2014-87787 A
PTL 2: JP 2003-230895 A

SUMMARY

Technical Problem

However, the treatment method according to PTL 1 necessitates large-scale treatment equipment and leaves room for improvement in terms of cost and installation space. Moreover, the treatment method according to PTL 2 is implemented with biological treatment and thus leaves room for improvement in terms of treatment performance under low temperature conditions, such as during the winter. Furthermore, the treatment methods according to PTL 1 and PTL 2 cannot sufficiently remove soluble manganese that is present in a dissolved form in raw water.

Accordingly, an objective of the present disclosure is to provide a method of removing soluble manganese that can improve water treatment efficiency through reduction in size of water treatment equipment and can sufficiently reduce the concentration of soluble manganese in treated water that is obtained thereby.

Solution to Problem

The inventors conducted diligent studies in order to achieve the objective set forth above. The inventors discovered that soluble manganese removal performance can be significantly increased when activated carbon powder of a specific size is used, and in this manner completed the present disclosure.

Specifically, the present disclosure aims to advantageously solve the problems set forth above by disclosing a method of removing soluble manganese comprising: a mixing step of mixing water for treatment, activated carbon micropowder having an average particle size of not less than 0.1 μm and not more than 10 μm, and an oxidizing agent to obtain a water/activated carbon mixture; and a membrane filtration step of membrane filtering the water/activated carbon mixture to obtain treated water. By mixing activated carbon micropowder of the specific particle size set forth above and an oxidizing agent with water for treatment prior to membrane filtration in this manner, water treatment efficiency can be improved through reduction in size of water treatment equipment and the concentration of soluble manganese in treated water that is obtained can be sufficiently reduced.

The "average particle size" of activated carbon referred to in the present specification is the value of a volume-average particle diameter D50 at which, in a particle diameter distribution (volume basis) measured by laser diffraction/scattering in accordance with JIS Z 8825, cumulative volume calculated from a small diameter end of the particle diameter distribution reaches 50%.

In the presently disclosed method of removing soluble manganese, an input amount of the activated carbon micropowder in the mixing step is preferably not less than 0.5 mg/L and not more than 30 mg/L. By setting the input amount of the activated carbon micropowder in the mixing step as an amount that is within the range set forth above, soluble manganese can be efficiently and rapidly insolubilized and the concentration of soluble manganese can be more sufficiently reduced.

In the presently disclosed method of removing soluble manganese, the activated carbon micropowder is preferably added after the oxidizing agent has been added to the water for treatment in the mixing step. This is because removal efficiency of odorants that may be contained in the water for treatment can be increased by adding the activated carbon micropowder after the oxidizing agent has been added in the mixing step.

In the presently disclosed method of removing soluble manganese, residence time from a point at which the oxidizing agent is added until a point at which the membrane filtration step ends is preferably not less than 1 minute and not more than 30 minutes. By setting the residence time from the point at which the oxidizing agent is added until the point at which the membrane filtration step ends as a time that is within the range set forth above, a more sufficient effect of soluble manganese removal can be achieved.

In the presently disclosed method of removing soluble manganese, it is preferable that the oxidizing agent is a chlorine-containing oxidizing agent, and the method of removing soluble manganese further comprises an oxidizing agent input amount determination step of determining an input amount of the oxidizing agent such that residual chlorine concentration in the treated water is 1 mg/L or less. By determining the input amount of the oxidizing agent such that residual chlorine concentration in the treated water is 1 mg/L or less, input of an excessive amount of the oxidizing agent in the mixing step can be avoided and soluble manganese can be efficiently removed.

Advantageous Effect

According to the present disclosure, it is possible to improve water treatment efficiency through reduction in size of water treatment equipment and sufficiently reduce the concentration of soluble manganese in treated water that is obtained.

DETAILED DESCRIPTION

The following provides a detailed description of embodiments of the present disclosure based on the drawings. It should be noted, however, that the present disclosure is not limited to the following embodiments. The presently disclosed method of removing soluble manganese may be used without any specific limitations in any application in which treatment of water containing soluble manganese is necessary. More specifically, the presently disclosed method of removing soluble manganese may be used for removing soluble manganese from water for treatment in various types of water treatment such as tap water treatment, service water treatment, sewerage treatment, wastewater treatment, or the like.

Figure 1:
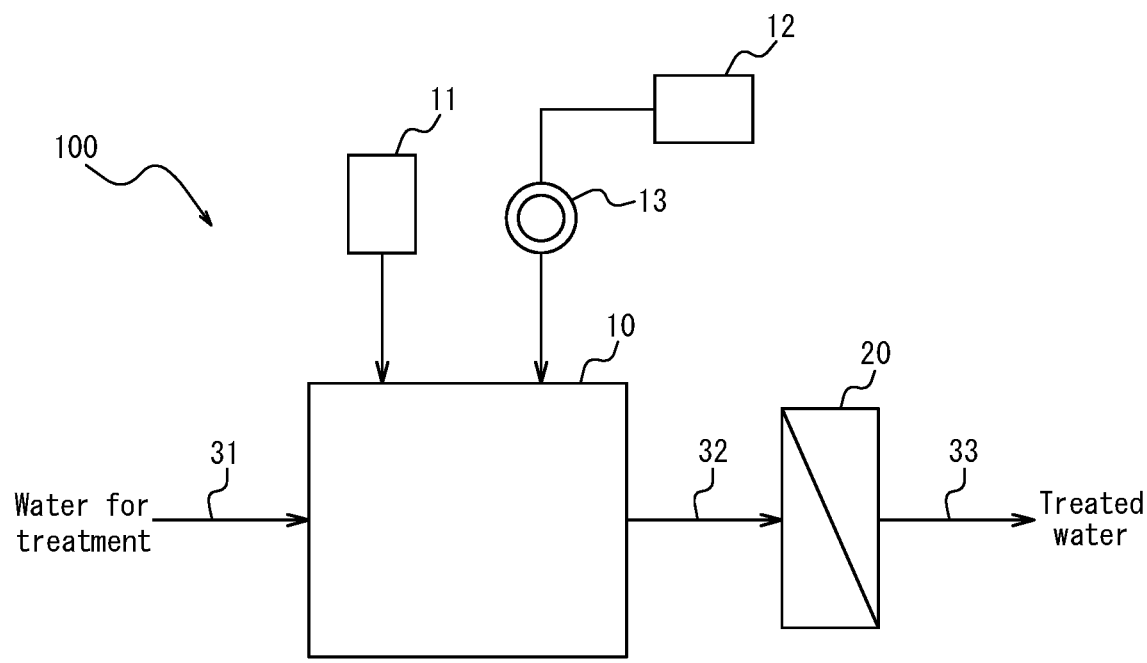
FIG. 1 illustrates an example of schematic configuration of a water treatment apparatus that can implement the presently disclosed method of removing soluble manganese.

The presently disclosed method of removing soluble manganese is not limited to a specific apparatus configuration and can, for example, be implemented by a water treatment apparatus having the schematic configuration illustrated in FIG. 1. A water treatment apparatus 100 illustrated in FIG. 1 includes a mixing tank 10 and a membrane filtration device 20. The mixing tank 10 has an oxidizing agent supply device 11, an activated carbon tank 12, and a milling device 13 for milling activated carbon supplied from the activated carbon tank 12. Water for treatment that contains soluble manganese is supplied to the mixing tank 10 via a treatment water line 31, is subjected to agitation by an agitation mechanism such as an impeller (not illustrated), and is mixed with an oxidizing agent and activated carbon micropowder inside the mixing tank 10 to form a water/activated carbon mixture. This water/activated carbon mixture is transferred to the membrane filtration device 20 via a water/activated carbon mixture line 32. The water/activated carbon mixture is membrane filtered in the membrane filtration device 20 and becomes treated water that is then discharged via a treated water line 33.

No specific limitations are placed on the mixing tank 10 so long as it enables mixing of an oxidizing agent and activated carbon micropowder with water for treatment. For example, a water tank that can typically be adopted in various types of water treatment equipment may be used as the mixing tank 10. The inside of the mixing tank 10 may be divided into a plurality of zones and may include, in any order, an oxidizing agent mixing zone for mixing of the water for treatment and the oxidizing agent, an activated carbon mixing zone for mixing of the water for treatment and the activated carbon micropowder, and so forth. In a case in which the mixing tank 10 includes a plurality of zones, a structure in which an oxidizing agent mixing zone is disposed at an upstream side and an activated carbon mixing zone is disposed at a downstream side of the oxidizing agent mixing zone as viewed in a direction of flow of the water for treatment, and that enables mixing of the activated carbon micropowder with a mixture of the oxidizing agent and the water for treatment is preferable. This is related to the addition order of the oxidizing agent and the activated carbon micropowder as described further below. Moreover, it is not essential that the mixing tank 10 is configured as what would be referred to as a "water tank". In other words, the mixing tank 10 may of course be substituted for a structure that enables consecutive or simultaneously addition of the oxidizing agent and the activated carbon micropowder to the water for treatment inside a line for transferring the water for treatment. Moreover, it is of course possible to adopt a configuration in which the activated carbon micropowder is added in a mixing tank 10 formed by a water tank and in which the oxidizing agent supply device 11 is connected to a treatment water line at a stage preceding the mixing tank 10 such as to add the oxidizing agent to the water for treatment thereat.

The oxidizing agent supply device 11 includes a tank that can store any of the various oxidizing agents described further below and an oxidizing agent supply mechanism (not illustrated) that can release a desired amount of the oxidizing agent from the tank. The oxidizing agent supply device 11 enables a certain amount of the oxidizing agent to be supplied to the mixing tank 10.

The activated carbon tank 12 is a tank that can store activated carbon and includes an activated carbon supply mechanism (not illustrated) that can supply a desired amount of the activated carbon to the milling device 13 from the tank. The milling device 13 is not specifically limited and may be a wet milling device. Fine milling devices such as a bead mill, a rolling ball mill, a vibratory ball mill, an attritor mill, and a jet mill can suitably be used as the milling device 13 without any specific limitations.

The membrane filtration device 20 may be a membrane filtration device that is internally divided into a primary side region and a secondary side region by a filtration membrane and that has a function of filtering a filtration target that is introduced into the primary side region by causing the filtration target to flow into the secondary side region through the filtration membrane so as to obtain filtered water. The filtration membrane may, for example, be a microfiltration membrane (MF membrane).

The following describes, as one example, a case in which the presently disclosed method of removing soluble manganese is implemented using the water treatment apparatus 100 illustrated in FIG. 1, which has been described above. The presently disclosed method of removing soluble manganese includes: a mixing step of mixing water for treatment, activated carbon micropowder having an average particle size of not less than 0.1 μm and not more than 10 μm, and an oxidizing agent to obtain a water-active carbon mixture; and a membrane filtration step of membrane filtering the water-active carbon mixture to obtain treated water. By using activated carbon micropowder having an average particle size of not less than 0.1 μm and not more than 10 μm in the presently disclosed method of removing soluble manganese in this manner, soluble manganese can be more rapidly insolubilized.

Enabling more rapid insolubilization of soluble manganese means that the reaction time of additives such as the oxidizing agent and activated carbon micropowder with the water for treatment can be shortened. It has generally been the case that increasing the size of a component part of an apparatus that ensures reaction time of additives with water for treatment, such as the mixing tank 10 in the case of the water treatment apparatus 100, has been adopted as a means of increasing reaction time. Therefore, enabling more rapid insolubilization of soluble manganese and shortening of the reaction time of additives with water for treatment in the presently disclosed method of removing soluble manganese means that a component part of an apparatus such as the mixing tank 10 can be reduced in size. This is hugely beneficial in light of the increasing need for size-reduction of water treatment equipment in recent years. Moreover, as a consequence of the presently disclosed method of removing soluble manganese enabling shortening of the reaction time of additives with water for treatment, it is possible to inhibit production of undesirable substances through reaction of organic substances with the oxidizing agent, which is one of the additives, in a situation in which the water for treatment contains organic substances. More specifically, chlorine-containing oxidizing agents that are typically used as oxidizing agents may react with organic substances to produce trihalomethane as a by-product. However, as a consequence of the presently disclosed method enabling shortening of the reaction time of additives with water for treatment, production of trihalomethane can be inhibited even in a case in which a chlorine-containing oxidizing agent is added to water for treatment that contains organic substances.

Each of the steps included in the presently disclosed method of removing soluble manganese is described below in detail.

Firstly, water for treatment, activated carbon micropowder having an average particle size of not less than 0.1 μm and not more than 10 μm, and an oxidizing agent are mixed in the mixing tank 10 to obtain a water/activated carbon mixture in the mixing step. Mixing of these materials in the mixing step enables highly efficient insolubilization of soluble manganese on the surface of the activated carbon micropowder. No specific limitations are placed on the order in which the activated carbon micropowder and the oxidizing agent are added to the water for treatment. For example, one of the activated carbon micropowder and the oxidizing agent may be added before the other thereof or both may be added simultaneously. However, it is preferable that the activated carbon micropowder is added after the oxidizing agent has been added to the water for treatment. By adopting an addition order in which the activated carbon micropowder is added after the oxidizing agent has been added, it is possible to increase odorant removal efficiency in a situation in which odorants other than soluble manganese are contained in the water for treatment. Although the reason for this is not clear, it is presumed that in a situation in which odorants are present in the water for treatment in a state contained in tissue of microorganisms or the like, by adding the oxidizing agent in advance of the activated carbon micropowder, contacting with the activated carbon micropowder can occur after at least some of the odorants contained in the microorganism tissue are released to outside of the tissue (i.e., into the water for treatment) through oxidation treatment of the microorganisms. In other words, it is presumed that at least some of the odorants encapsulated inside the microorganisms are released into the water for treatment to enable the creation of an environment that facilitates treatment of the odorants by the activated carbon micropowder.

The average particle size of the activated carbon micropowder used in the mixing step is preferably 5 μm or less, and is more preferably 3 μm or less. The use of activated carbon micropowder having an average particle size of 5 μm or less enables higher efficiency insolubilization of soluble manganese. Consequently, the residence time from the mixing tank 10 to the membrane filtration device 20 can be further shortened. This enables further size-reduction of the water treatment apparatus 100.

The activated carbon micropowder can be prepared by, for example, using the milling device 13 to perform milling to obtain an average particle size such as set forth above with respect to activated carbon obtained through chemical activation treatment using zinc chloride, phosphoric acid, or the like or physical activation treatment using water vapor, carbon dioxide, air, combustion gas, or the like performed with a carbon material such as coconut shell charcoal, coal, sawdust, or woodchips as a starting material. The activated carbon micropowder has a porous structure. The specific surface area of the activated carbon micropowder is normally not less than 500 $m^2/g$ and not more than 2,500 $m^2/g$.

Note that the milling device 13 can increase or decrease the particle size of the activated carbon micropowder obtained through milling depending on the concentration of soluble manganese and the concentration of odorants in the water for treatment prior to introduction into the mixing tank 10, the concentration of a slurry produced by mixing of the oxidizing agent and the water for treatment inside the mixing tank 10 (hereinafter, also referred to simply as the "slurry concentration"), and so forth. Moreover, the milling device 13 can increase or decrease the particle size of the activated carbon micropowder obtained through milling depending on the concentration of soluble manganese and the concentration of odorants in treated water that has passed through the membrane filtration device 20, the slurry concentration, and so forth. For example, the milling device 13 can adjust the milling conditions such that the activated carbon micropowder has a comparatively small particle size in a situation in which the concentration of soluble manganese in the water for treatment is high, a situation in which the concentration of soluble manganese in the treated water is high, and a situation in which the slurry concentration is high. The activated carbon supply mechanism (not illustrated) included in the activated carbon tank 12 can increase or decrease the amount of activated carbon that is supplied depending on the various concentrations described above.

Through dynamic control relating to the particle size and supplied amount of the activated carbon micropowder in this manner, the soluble manganese treatment conditions can be optimized in accordance with changes in properties of water for treatment.

The input amount of the activated carbon micropowder in the mixing step is preferably 0.5 mg/L or more, and more preferably 1 mg/L or more, and is preferably 30 mg/L or less, and more preferably 5 mg/L or less. By setting the input amount of the activated carbon micropowder within any of the ranges set forth above, soluble manganese can be rapidly insolubilized, and soluble manganese concentration can be more sufficiently reduced. Note that setting the input amount of the activated carbon micropowder as not more than any of the upper limits set forth above is preferable in terms of cost versus effect because the effect of soluble manganese removal reaches saturation upon input of an excessive amount of the activated carbon micropowder.

The input amount of the activated carbon micropowder can be adjusted through the supply mechanism included in the oxidizing agent supply device 11. The oxidizing agent supply device 11 can increase or decrease the supplied amount of the oxidizing agent depending on the concentration of soluble manganese and the concentration of odorants in the water for treatment prior to introduction into the mixing tank 10. Moreover, the oxidizing agent supply device 11 can increase or decrease the supplied amount of the oxidizing agent depending on the concentration of soluble manganese and the concentration of odorants in the treated water that has passed through the membrane filtration device 20. More specifically, the oxidizing agent supply device 11 can increase the input amount of the oxidizing agent in a situation in which the concentration of soluble manganese in the water for treatment is high and in a situation in which the concentration of soluble manganese in the treated water is high. Through dynamic control of the input amount of the oxidizing agent in this manner, the soluble manganese treatment conditions can be optimized in accordance with changes in properties of water for treatment.

No specific limitations are placed on oxidizing agents that can be used in the mixing step so long as they can oxidize soluble manganese in the water for treatment. For example, an oxidizing agent such as a chlorine-containing oxidizing agent (for example, sodium hypochlorite, calcium hypochlorite, or chlorine), potassium permanganate, oxygen, or ozone may be used. Of these oxidizing agents, sodium hypochlorite is preferable.

The input amount of the oxidizing agent in the mixing step is preferably set as an amount such that residual chlorine concentration in the treated water is 1 mg/L or less. When the residual chlorine concentration in the treated water is 1 mg/L or less, use of an excessive amount of oxidizing agent can be avoided and soluble manganese can be efficiently removed. Moreover, when the residual chlorine concentration in the treated water is 1 mg/L or less, the production of by-products through reaction of residual chlorine with other substances contained in the treated water can be inhibited. The input amount of the oxidizing agent in the mixing step may be determined, for example, based on the concentration of soluble manganese in the water for treatment. Alternatively, a feedback configuration may be adopted in which the residual chlorine concentration in treated water that has passed through the membrane filtration device 20 is measured and the input amount of the oxidizing agent is reduced in a case in which the value for the residual chlorine concentration exceeds 1 mg/L. Moreover, the input amount of the oxidizing agent in the mixing step is more preferably an amount such that the residual chlorine concentration in the treated water is a higher value than the lower limit of detection of a measurement instrument (for example, 0.05 mg/L or more). By setting the input amount of the oxidizing agent in the mixing step as not less than this lower limit, soluble manganese in the water for treatment can be rapidly insolubilized and the concentration of soluble manganese in the treated water can be more sufficiently reduced. In addition, proliferation of bacteria or the like in the treated water can be inhibited by setting the input amount of the oxidizing agent as not less than the aforementioned lower limit.

In the membrane filtration step, the water/activated carbon mixture obtained in the mixing step is membrane filtered in the membrane filtration device 20 to obtain treated water. Note that although blocking of a filtration membrane occurs if filtration is performed continuously, this blocking can be resolved by washing the filtration membrane at a certain timing. The method of washing is not specifically limited and may be a membrane regeneration method such as backwashing that is typically adopted in a water treatment apparatus including a membrane filtration device.

The residence time from a point at which the oxidizing agent is added in the mixing step until a point at which the membrane filtration step ends is preferably 1 minute or more, more preferably 5 minutes or more, and even more preferably 30 minutes or less. A more sufficiently high manganese removal effect can be achieved when the residence time is not less than any of the lower limits set forth above. Moreover, sufficiently high soluble manganese removal treatment can be efficiently implemented when the residence time is not more than the upper limit set forth above because even if a long residence time is set, the effect of soluble manganese removal reaches saturation. In addition, when the residence time is not more than the upper limit set forth above, it is possible to inhibit production of undesirable by-products such as trihalomethane, for example, through reaction of the oxidizing agent (for example, a chlorine-containing oxidizing agent) with organic substances that may be contained in the water for treatment.

EXAMPLES

The following provides a more specific description of the present disclosure based on examples. However, the present disclosure is not limited to the following examples.

In the examples and comparative examples, the concentration of soluble manganese in water for treatment that is a treatment target for the presently disclosed method of removing soluble manganese and in treated water obtained through a membrane filtration step of the presently disclosed method of removing soluble manganese were measured by inductively coupled plasma mass spectrometry in accordance with Tap Water Testing Methods (Japan Water Works Association, 2011 Edition).

In addition, the residence time was measured as the time from a point at which an oxidizing agent was added until a point at which treated water obtained through a membrane filtration step was collected.

Example 1

Artificial raw water obtained by adding manganese chloride to pure water was used as water for treatment containing soluble manganese, sodium hypochlorite was used as an oxidizing agent, and activated carbon micropowder having an average particle size of 1 μm (volume-average particle diameter D50 based on laser diffraction/scattering in accordance with JIS Z 8825) and having a wood-based material as a raw material was used as activated carbon micropowder.

Figure 2:
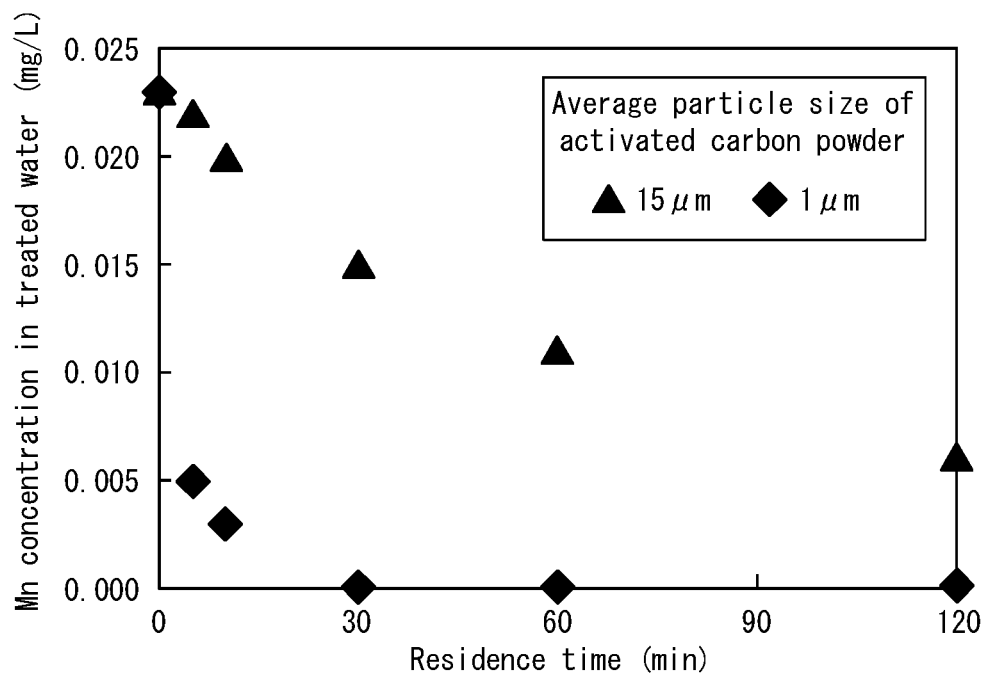
FIG. 2 is a graph illustrating a relationship between soluble manganese concentration in treated water and residence time.

First, the activated carbon micropowder was added in a mixing step such that the concentration of the activated carbon micropowder in a water/activated carbon mixture was 1 mg/L. The concentration of soluble manganese in treated water was measured for treated water obtained in cases in which the residence time until the end of a membrane filtration step was set as 5 minutes, 10 minutes, 30 minutes, 60 minutes, and 120 minutes. The results are illustrated in FIG. 2. Moreover, the residual chlorine concentration in treated water measured by the DPD (diethyl-p-phenylenediamine) method was not less than 0.05 mg/L and not more than 1 mg/L for treated water corresponding to all of the residence times.

Comparative Example 1

With the exception that activated carbon having an average particle size of 15 μm was used instead of the activated carbon micropowder, the concentration of soluble manganese in treated water that was obtained was measured in the same way as in Example 1. The results are illustrated in FIG. 2.

It is clear from FIG. 2 that the soluble manganese concentration in treated water decreased dramatically between 1 minute and 30 minutes in Example 1 in which activated carbon micropowder having an average particle size of 1 μm was used. On the other hand, it can be seen that in Comparative Example 1 in which activated carbon having an average particle size of 15 μm was used, a residence time of approximately 120 minutes was required in order to achieve an effect rivaling that achieved with a residence time of 5 minutes in Example 1. Thus, it can be seen that the method of removing soluble manganese in Example 1 enabled rapid and sufficient reduction of the concentration of soluble manganese in treated water. Moreover, since the residence time can be dramatically shortened in Example 1, the size of water treatment equipment can be dramatically reduced.

INDUSTRIAL APPLICABILITY

According to the present disclosure, it is possible to improve water treatment efficiency through reduction in size of water treatment equipment and sufficiently reduce the concentration of soluble manganese in treated water that is obtained.

REFERENCE SIGNS LIST 10 mixing tank
11 oxidizing agent supply device
12 activated carbon tank
13 milling device
20 membrane filtration device
31 treatment water line
32 water/activated carbon mixture line
33 treated water line
100 water treatment apparatus

The invention claimed is:

1. A method of removing soluble manganese comprising:
a mixing step of mixing water for treatment, activated carbon micropowder having an average particle size of not less than 0.1 μm and not more than 10 μm, and a chlorine-containing oxidizing agent to obtain a water/activated carbon mixture;
a membrane filtration step of membrane filtering the water/activated carbon mixture to obtain treated water, and
an oxidizing agent input amount determination step of determining an input amount of the chlorine-containing oxidizing agent such that residual chlorine concentration in the treated water is 1 mg/L or less, wherein
the activated carbon micropowder is added after the chlorine-containing oxidizing agent has been added to the water for treatment in the mixing step and
residence time from a point at which the chlorine-containing oxidizing agent is added until a point at which the membrane filtration step ends is not less than 1 minute and not more than 30 minutes.

2. The method of removing soluble manganese according to claim 1, wherein an input amount of the activated carbon micropowder in the mixing step is not less than 0.5 mg/L and not more than 30 mg/L.

* * * * *